United States Patent [19]

Chikamatsu et al.

[11] Patent Number: 5,732,799
[45] Date of Patent: Mar. 31, 1998

[54] BRAKING APPARATUS AND ROLLING GUIDE UNIT ON WHICH IT IS EQUIPPED

[75] Inventors: Yukinobu Chikamatsu; Toshiaki Geka, both of Kanagawa, Japan

[73] Assignee: Nippon Thompson Co., Ltd., Tokyo, Japan

[21] Appl. No.: 547,778

[22] Filed: Oct. 25, 1995

[30] Foreign Application Priority Data

Oct. 27, 1994 [JP] Japan .................................. 6-287422

[51] Int. Cl.$^6$ .................................................. F15B 15/08
[52] U.S. Cl. ........................................ 188/67; 188/83
[58] Field of Search ...................... 188/67, 41–45, 188/83; 384/43–50, 54; 104/290, 307; 105/463.1; 92/88; 269/60; 33/1 M, 1 Q; 476/67, 70, 68; 248/657, 661; 414/749; 108/143

[56] References Cited

U.S. PATENT DOCUMENTS

| | | | |
|---|---|---|---|
| 2,928,502 | 3/1960 | Troften | 188/43 |
| 3,486,592 | 12/1969 | Kolk et al. | 188/44 |
| 3,807,532 | 4/1974 | Molt | 188/43 |
| 3,840,095 | 10/1974 | Matron | 188/67 |
| 4,234,059 | 11/1980 | Schaad | 188/43 |
| 4,234,060 | 11/1980 | Barsted | 188/44 |
| 4,308,937 | 1/1982 | Johnson | 188/43 |
| 4,359,247 | 11/1982 | Miller | 188/41 |
| 4,377,220 | 3/1983 | Briggs | 188/44 |
| 4,615,515 | 10/1986 | Suzuta et al. | 188/43 |
| 4,926,982 | 5/1990 | Granbom | 188/67 |
| 5,111,913 | 5/1992 | Granbom | 188/67 |
| 5,326,197 | 7/1994 | Takei | 384/45 |
| 5,357,819 | 10/1994 | Takei | 108/143 |
| 5,362,157 | 11/1994 | Ichida | 384/45 |
| 5,460,452 | 10/1995 | Hara | 384/45 |
| 5,469,940 | 11/1995 | Yamamoto et al. | 18/67 |
| 5,473,992 | 12/1995 | Takei | 188/36 |
| 5,678,663 | 10/1997 | Watanabe et al. | 188/67 |

*Primary Examiner*—Douglas C. Butler
*Attorney, Agent, or Firm*—Sughrue, Mion, Zinn, Macpeak & Seas, PLLC

[57] ABSTRACT

A braking apparatus and a rolling guide unit on which it is equipped. A pressure control device, such as a hydraulic cylinder mechanism, operates according to a braking command signal emitted when an operation switch for braking is actuated, or when the braking command signal is emitted based on memory data. This causes the braking members to make contact with and push against a surface of the track rails other than the track surface, in order to fix the position of the rolling guide unit. The braking members are released from the surface based on the emission of a braking release command signal, so that the position is no longer fixed.

15 Claims, 16 Drawing Sheets

BRAKING APPARATUS AND ROLLING GUIDE UNIT ON WHICH IT IS EQUIPPED

BACKGROUND OF THE INVENTION

1. Field of the Invention

The present invention relates to a rolling guide unit that is equipped on the movement mechanism of, for example, a machine tool, which guides a movable object to be moved with high accuracy, and a suitable braking apparatus provided on said rolling guide unit and so forth for fixing said movable object.

2. Description of the Prior Art

An example of this type of linear motion rolling guide unit equipped with a braking apparatus of the prior art is shown in FIGS. 1 through 3. As shown in the drawings, this nonlinear motion rolling guide unit has two track rails 3 that are fixed mutually in parallel by bolts 2 on bed 1 (see FIG. 1) equipped on a machine tool and so forth, and for example two, sliders in the form of slide units 5 that are guided by each of said track rails 3. A movable object in the form of rectangular plate-shaped table 8 is fastened on these slide units 5 by bolts 9 (see FIG. 1). As shown in FIGS. 2 and 3, a total of four tracks in the form of track surfaces 3a are formed in parallel along the lengthwise direction in track rails 3, with two track surfaces each on the left and right sides. Both of the above-mentioned slide units 5 have four rolling element circulating paths (not shown) that include load bearing tracks that respectively correspond to each track surface 3a. A large number of balls (not shown) are arranged and contained within each of said rolling element circulating paths that bear the load between track rails 3 and slide units 5 by circulating while rolling over track surfaces 3a accompanying movement of slide units 5.

As shown in the drawings, braking apparatus 11 is arranged near one of the two slide units 5 provided. This braking apparatus 11 brakes slide units 5 with respect to track rails 3 so that the above-mentioned table 8 becomes fixed, and is composed in the manner described below.

Namely, the above-mentioned braking apparatus 11 has stationary plate 14, which together with being arranged on the lower surface of the above-mentioned table 8 so as to be positioned at a prescribed interval with respect to the upper surface of track rail 3, is fastened to said table 8 with bolts 13, a pair of moving braking members 16 and 17 that are arranged on both sides of said stationary plate 14 and separated closely about the lateral surfaces of track rail 3 (indicated with arrows $Y_1$), and tightening screw 19 that screws into both said braking members 16 and 17 for moving each of said braking members. Furthermore, lever 20 is attached to said tightening screw 19, and tightening screw 19 is turned by operation of said lever 20 by an operator.

More specifically, with respect to the above-mentioned tightening screw 19, threaded portions 19a and 19b (see FIG. 3) have mutually opposite threads with respect to both braking members 16 and 17. In addition, as shown in FIG. 3, coil spring 22 is juxtaposed between both said braking members 16 and 17 to apply force in the direction in which said braking members 16 and 17 move apart.

In the above-mentioned constitution, for example, a workpiece (not shown) is mounted on table 8, and said table 8 is suitably moved as shown with arrow F in FIGS. 1 and 2 by a driving device not shown. When table 8 reaches a desired position, it is stopped and fixed in position by the operation of braking apparatus 11 by an operator. More specifically, as shown in FIG. 2, when an operator turns lever 20 to the right, both braking members 16 and 17 approach the lateral surfaces of track rail 3 to make contact and apply pushing pressure. As a result, a large frictional force is produced between both lateral surfaces of track rail 3 and both braking members 16 and 17, thus fixing the position of table 8. In this fixed state, the desired processing, such as cutting work and so forth, is performed on the above-mentioned workpiece.

In order to release that above-mentioned fixed state, the above-mentioned lever 20 should be turned in the opposite direction. As a result of turning in the opposite direction, both braking members 16 and 17 are separated from track rail 3. As was described previously, since coil spring 22 is provided that applies force in the direction in which both braking members 16 and 17 move apart, separation from track rail 3 by both braking members 16 and 17 is promoted by the application of this force.

In the apparatus having the above-mentioned constitution, when the operation of the driving device that moves said table 8 is stopped, in many cases it becomes fixed in position with a certain degree of strength based on the rigidity of the power transmission mechanism equipped on said driving device. However, since the cutting force and so forth that is received during the time cutting work and so forth is being performed on the workpiece is relatively large, said fixed state is insufficient for attempting to dampen vibrations that are produced as a result of cutting and so forth, as well as to achieve uniformity of the surface properties of the processed surface of the workpiece. Accordingly, it is useful to obtain a solid fixed state using braking apparatus 11 as described above.

However, in braking apparatus 11 as described above, since an operator performs the action of braking by operating lever 20 himself, in cases such as when handling workpieces having a large number of sites to be processed, or when sequentially processing a large number of workpieces, the number of times braking apparatus 11 is operated becomes extremely large. In addition, a significant amount of time is spent for operation each time. Accordingly, this becomes a factor that impedes improvement of work efficiency, and especially when it is desirable to complete the work in a short time, this has the effect of being bothersome for the operator.

In addition, since the operator must control the operation of the cutter or other machine tool as well as the operation of the above-mentioned braking apparatus 11, in addition to his range of movement during work being excessively increased, it also has the disadvantage of forcing him to work too busily.

SUMMARY OF THE INVENTION

In consideration of the above-mentioned disadvantages of the prior art, the object of the present invention is to provide a braking apparatus and a rolling guide unit on which it is equipped that, together with contributing to improvement of work efficiency during work using a machine tool and so forth, is extremely easy to operate, and is able to offer various other advantages.

The braking apparatus according to the present invention is composed so as to have braking members that perform braking action by making contact with the surface of a prescribed track rail; and, a pressure control device that applies pushing pressure on said braking members towards said surface.

In addition, the rolling guide unit according to the present invention is equipped with track rails in which tracks are formed along the lengthwise direction; sliders having a rolling element circulating path that includes load bearing tracks corresponding to said tracks, and which are able to freely perform relative movement with respect to said track rails; a plurality of rolling elements that are arranged and contained within said rolling element circulating path, and which bear the load by rolling along said tracks; and, a braking apparatus that mutually brakes said track rails and sliders; wherein, said braking apparatus is composed so as to have braking members that perform braking action by making contact with the surface of said track rails, and a pressure control device that applies pushing pressure to said braking members towards said surface.

According to the above-mentioned constitution, the above-mentioned pressure control device operates based on a braking command signal and so forth emitted by some type of device, and as a result, the above-mentioned braking members make contact with and push against the track rail surface, while said pushing state is released as a result of the emission of a braking release signal and so forth.

DESCRIPTION OF THE PREFERRED EMBODIMENTS

The following provides an explanation of the embodiments of the present invention with reference to the attached drawings.

A linear motion rolling guide unit as a first embodiment of the present invention is shown in FIGS. 4 through 12.

Figure 1:
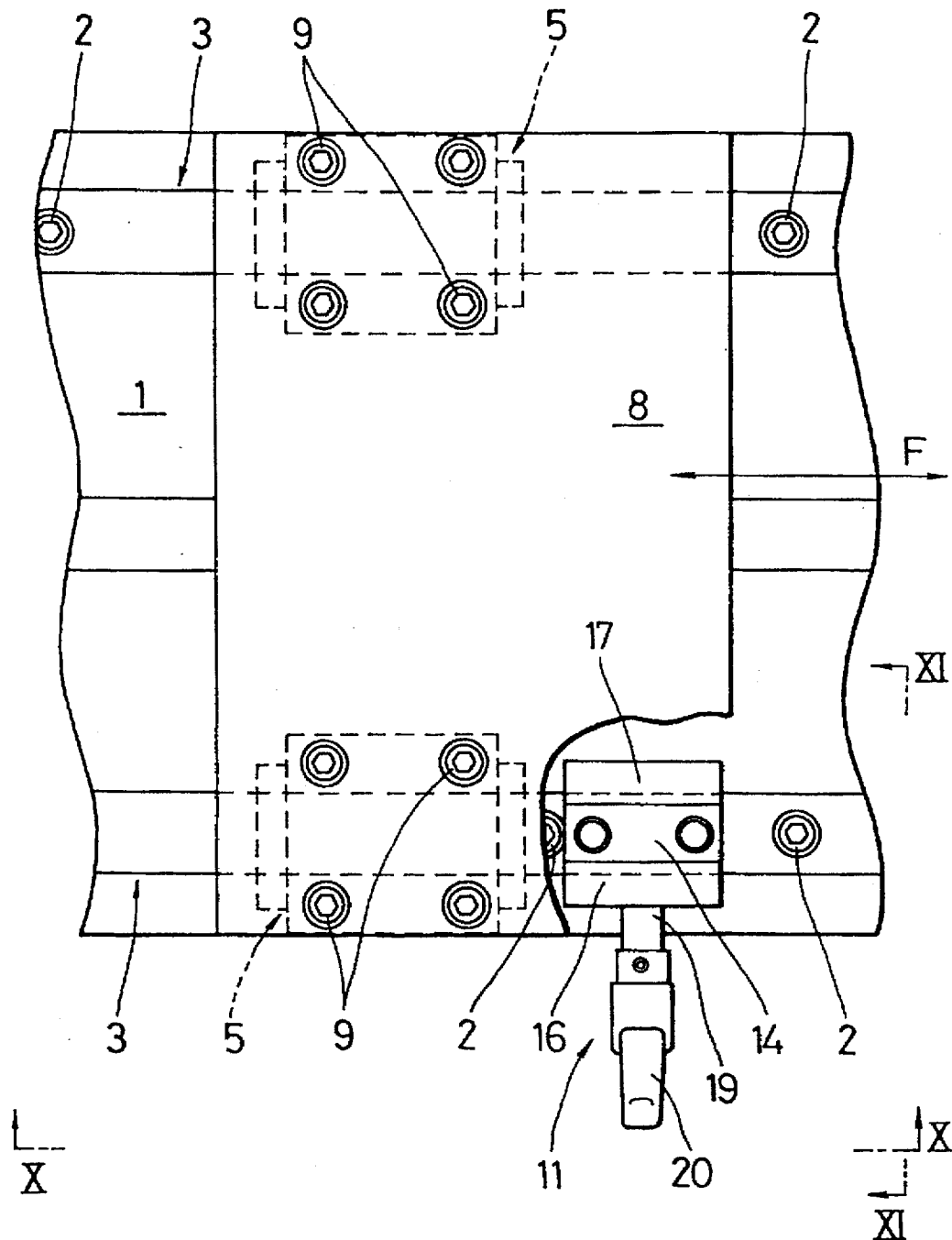
FIG. 1 is an overhead view, including a partial cross-section, showing the rolling guide unit containing a braking apparatus of the prior art mounted on the bed of a machine tool and so forth.
Figure 2:
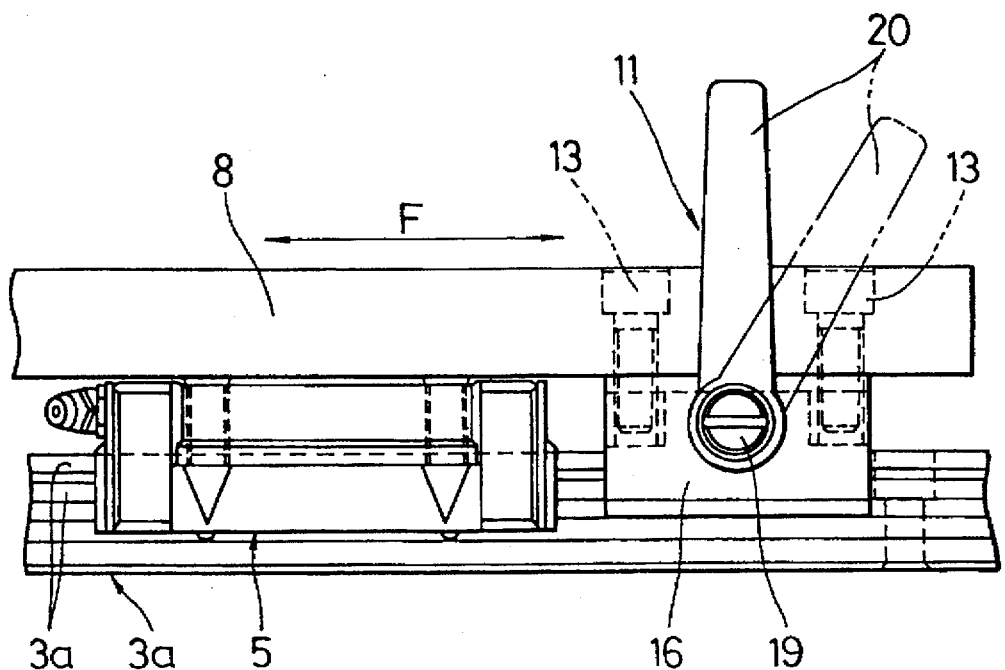
FIG. 2 is a view taken along arrows X—X relating to FIG. 1.
Figure 3:
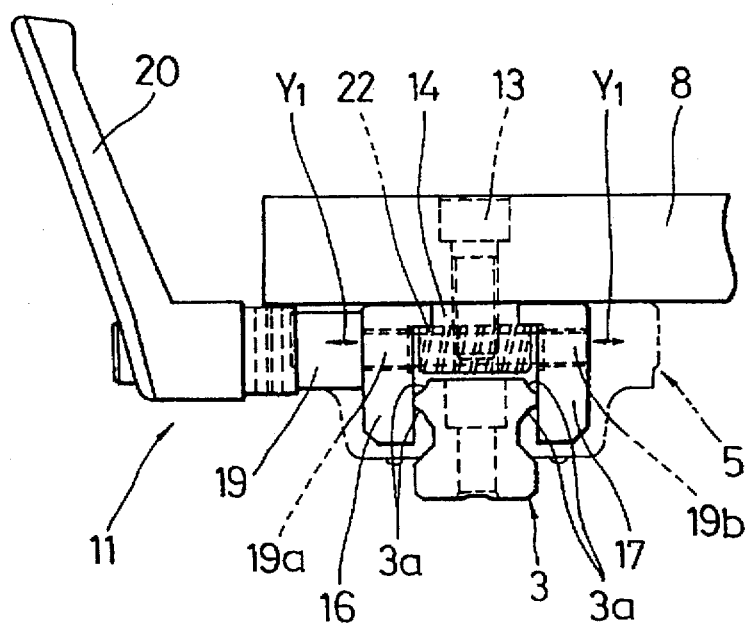
FIG. 3 is a view taken along arrows XI—XI relating to FIG. 1.
Figure 4:
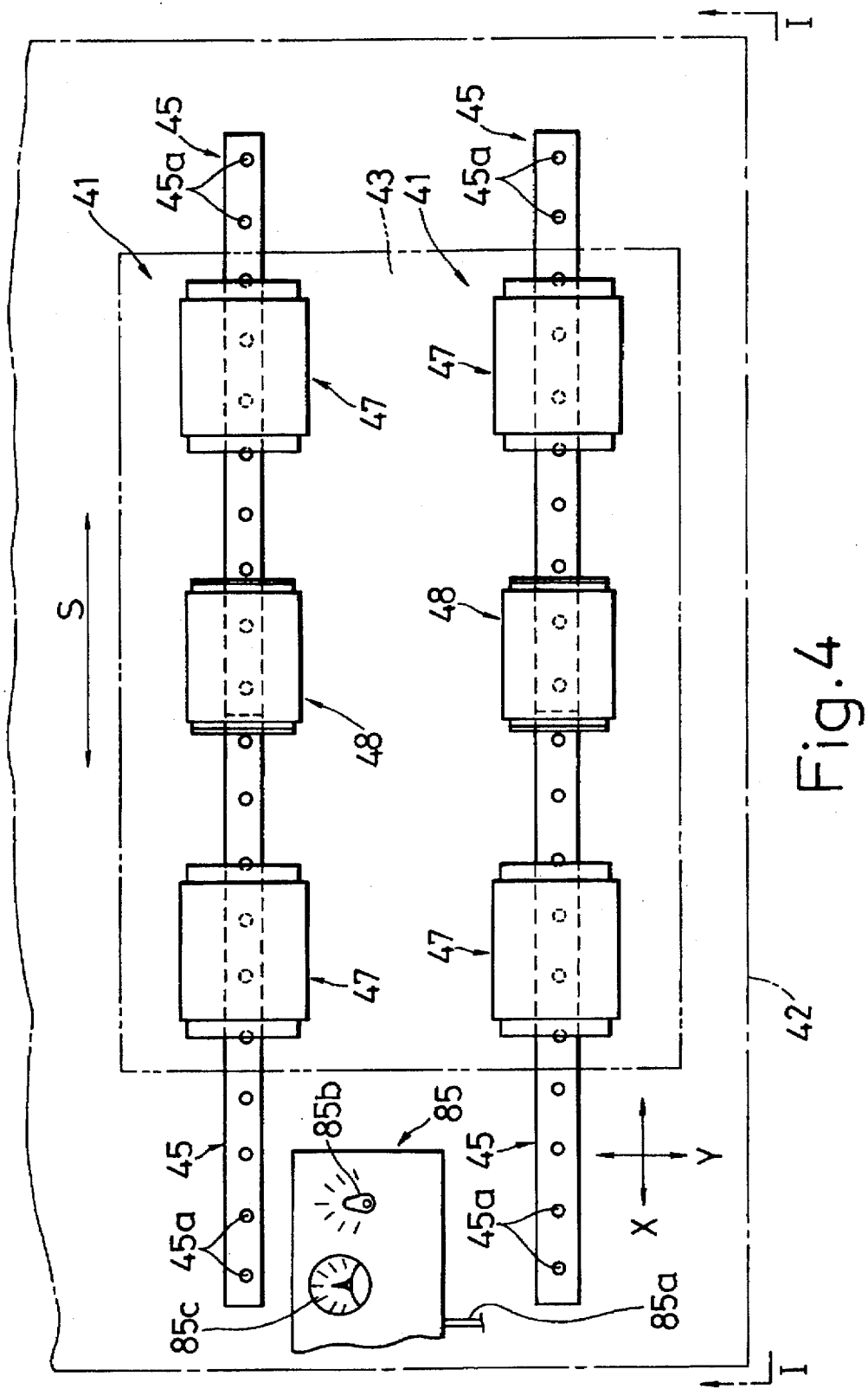
FIG. 4 is an overhead view showing a linear motion rolling guide unit as a first embodiment of the present invention mounted on the bed of a machine tool.
Figure 5:
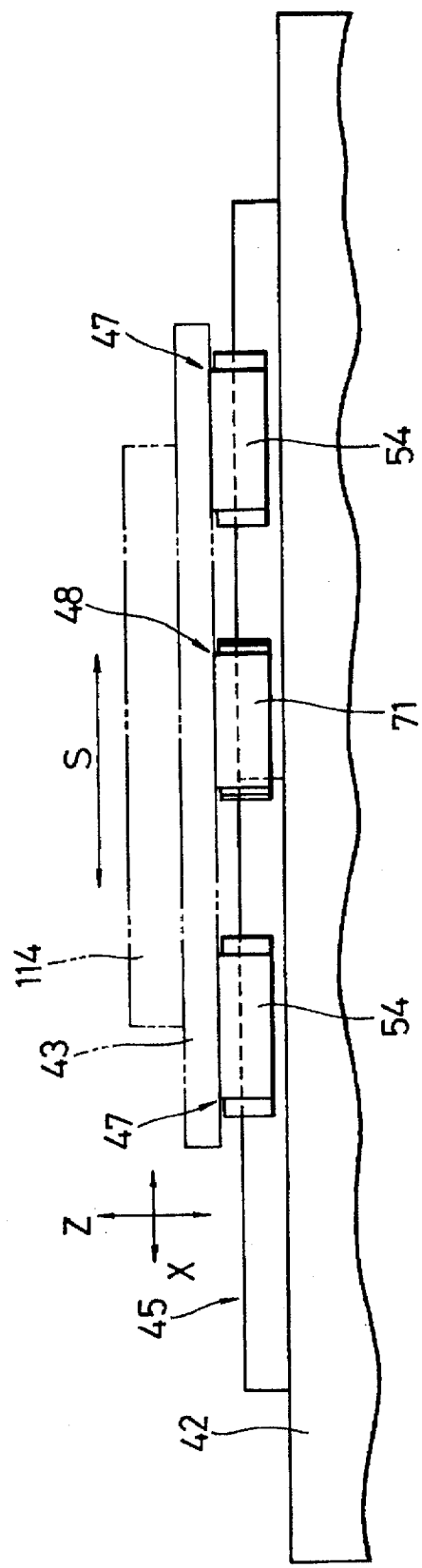
FIG. 5 is a view taken along arrows I—I relating to FIG. 4.

In FIGS. 4 and 5, two sets of this linear motion rolling guide unit 41 are provided in parallel on bed 42 equipped on a machine tool in the form of a cutting machine (the entire cutting machine is not shown), and support table 43 so as to move it jointly.

Figure 6:
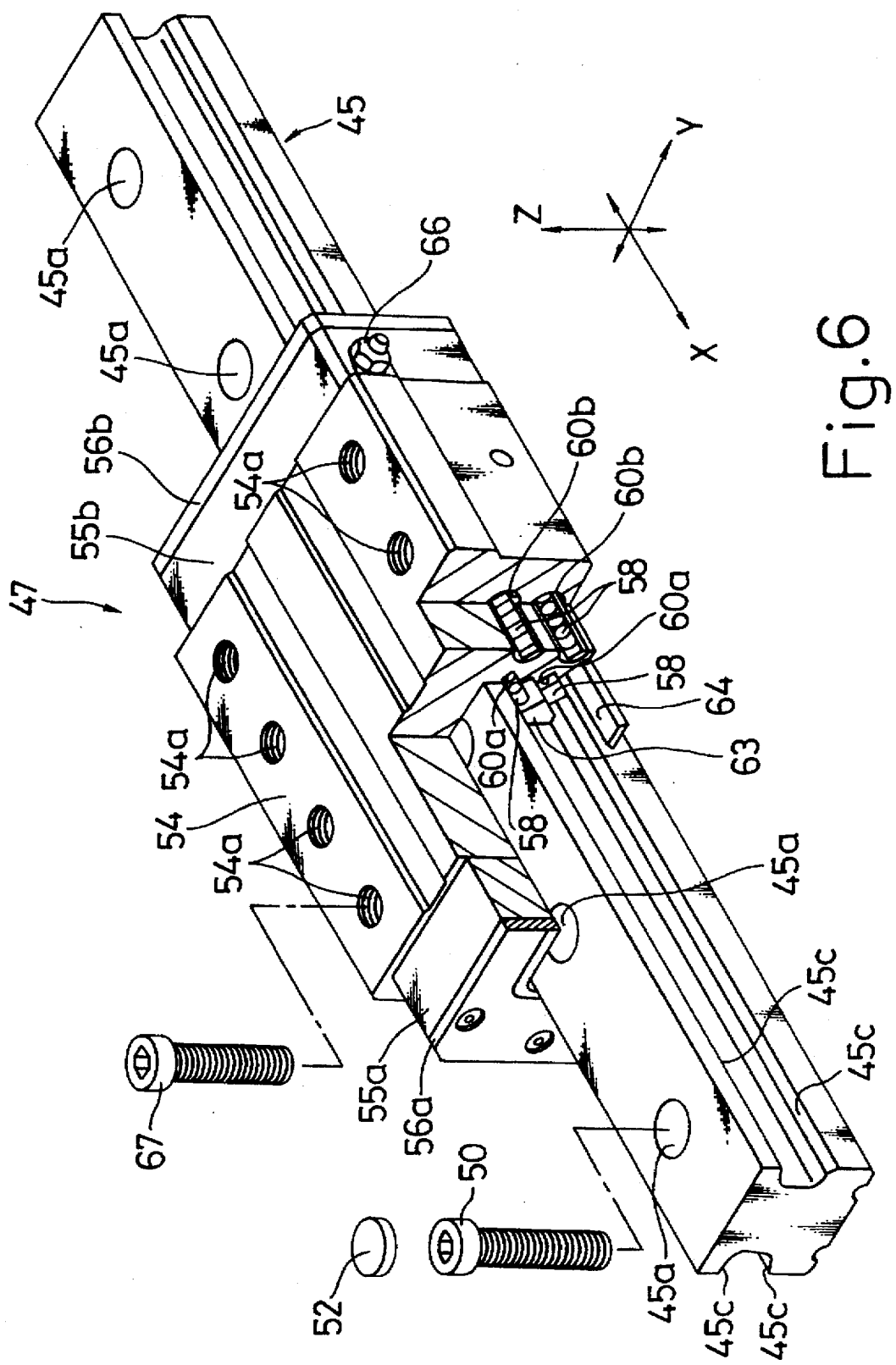
FIG. 6 is a perspective view, including a partial cross-section, of the track rails and slide units equipped on the linear motion rolling guide unit shown in FIGS. 4 and 5.

Both linear motion rolling guide units 41 respectively have two straight track rails 45 fixed in a row on bed two sliders in the form of slide units 47 able to freely perform relative movement with respect to said track rails 45, and a braking apparatus in the form of brake unit 48, arranged so as to be positioned between both said slide units 47 in front and behind, that is guided by track rail 45. Furthermore, as shown in FIG. 6, each track rail 45 is fastened to bed 42 by a plurality of bolts 50 (with hexagon sockets). More specifically, insertion holes 45a, having a large diameter portion and small diameter portion, are formed in track rails 45 in which the head portions and threaded portions, respectively, of said bolts 50 are able to be inserted, and bolts 50 are inserted into said insertion holes 45a and screwed in so that their entirety is embedded in said insertion holes 45a. In addition, as shown in FIG. 6, after screwing in bolts 50, plugs 52 are fit into the openings of said insertion holes 45a, and lie in the same plane as the upper surface of track rail 45.

Figure 7:
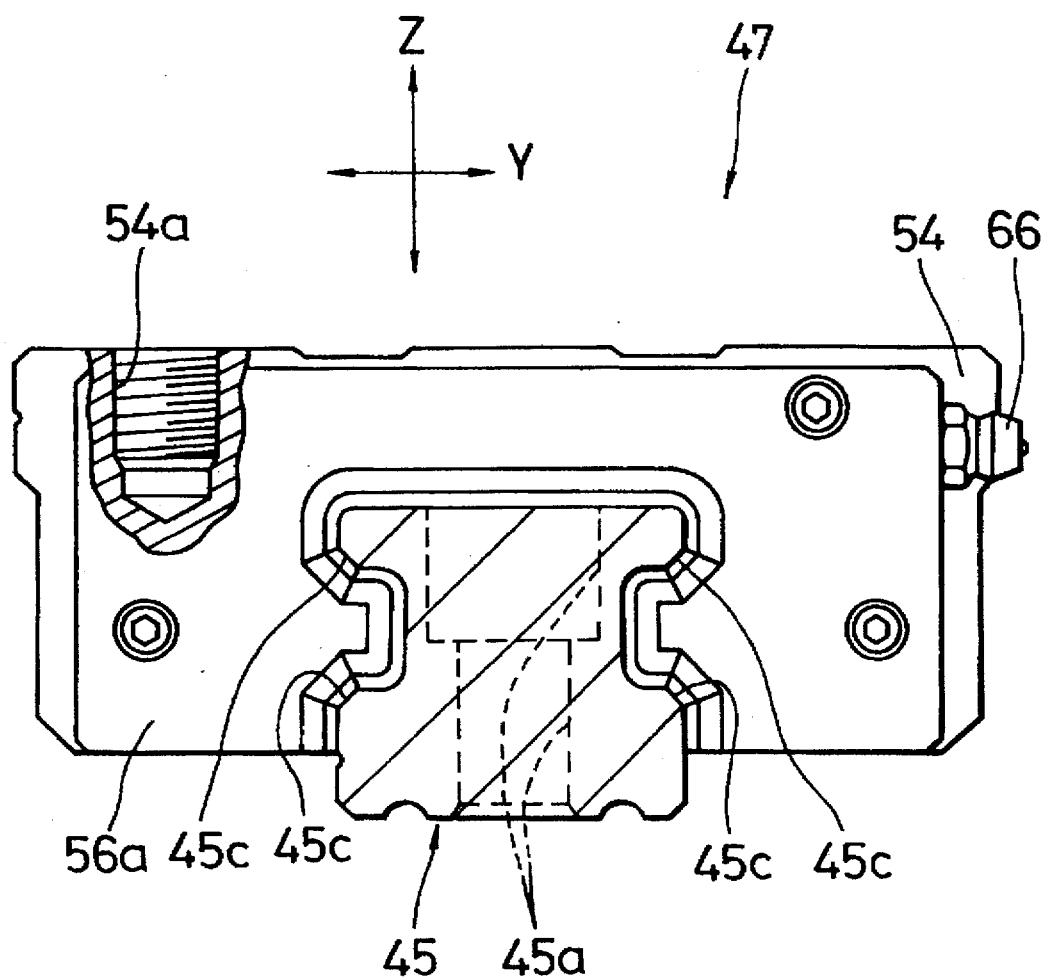
FIG. 7 is a left side view, including a partial cross-section, of the constitution shown in FIG. 6.

As shown in FIGS. 6 and 7 tracks in the form of two track surfaces 45c each are formed in track rail 45 in its left and right sides along the lengthwise direction. As is clear from the drawings, slide unit 47 has casing 54 juxtaposed about track rail 45, a pair of end caps 55a and 55b coupled to both the front and back ends of said casing 54, and seal members 56a and 56b attached to each of the outside surfaces of both said end caps. Furthermore, the front and rear directions, left and right directions, and up and down directions of said linear motion rolling guide unit are defined, and shown in the respective drawings with arrows X, Y and Z, respectively, for the purpose of indicating the overall orientation of said linear motion rolling guide unit as well as clarifying the relative positional relationships of each member equipped on said guide unit.

In FIG. 6, an equal number of rolling element circulating paths corresponding to each track surface 45c, of which two each are formed on the left and right sides of track rail 45, are formed in slide unit 47. A large number of rolling elements in the form of rollers 58 are arranged and contained within each of said rolling element circulating paths. These rollers 58 bear the load between track rails 45 and slide units 47 by circulating while rolling along the above-mentioned track surfaces 45c accompanying movement of slide units 47. Furthermore, said rolling element circulating paths are composed of load bearing track groove 60a and return path 60b formed in parallel in the above-mentioned casing 54, and roughly semicircular direction changing paths (not shown) respectively formed in both of the above-mentioned end caps 55a and 55b that mutually connect said load bearing track groove 60a and return path 60b at both their ends. The above-mentioned load bearing track groove 60a corresponds to track surface 45c of track rail 45.

Furthermore, reference numerals 63 and 64 in FIG. 6 indicate retaining members that retain rollers 58 to prevent them from falling out of the above-mentioned load bearing track groove 60a when slide unit 47 is removed from track rail 45. In addition, as shown in FIGS. 6 and 7, grease nipple 66, for providing a lubricant such as grease to each of the above-mentioned rollers 58, is attached to at least one of either of end caps 55a or 55b. In addition, as shown in the same drawings, a plurality, for example eight, of threaded holes 54a are formed in the upper surface of casing 54 of slide unit 47. Table 43 shown in FIGS. 4 and 5 is fastened to said casing 54 by bolts 67 (with hexagon sockets; shown in FIG. 6) that screw into these threaded holes 54a.

On the other hand, a braking apparatus in the form of brake unit 48, provided for braking each slide unit 47 on the above-mentioned track rails 45 is composed in the manner described below.

Figure 8:
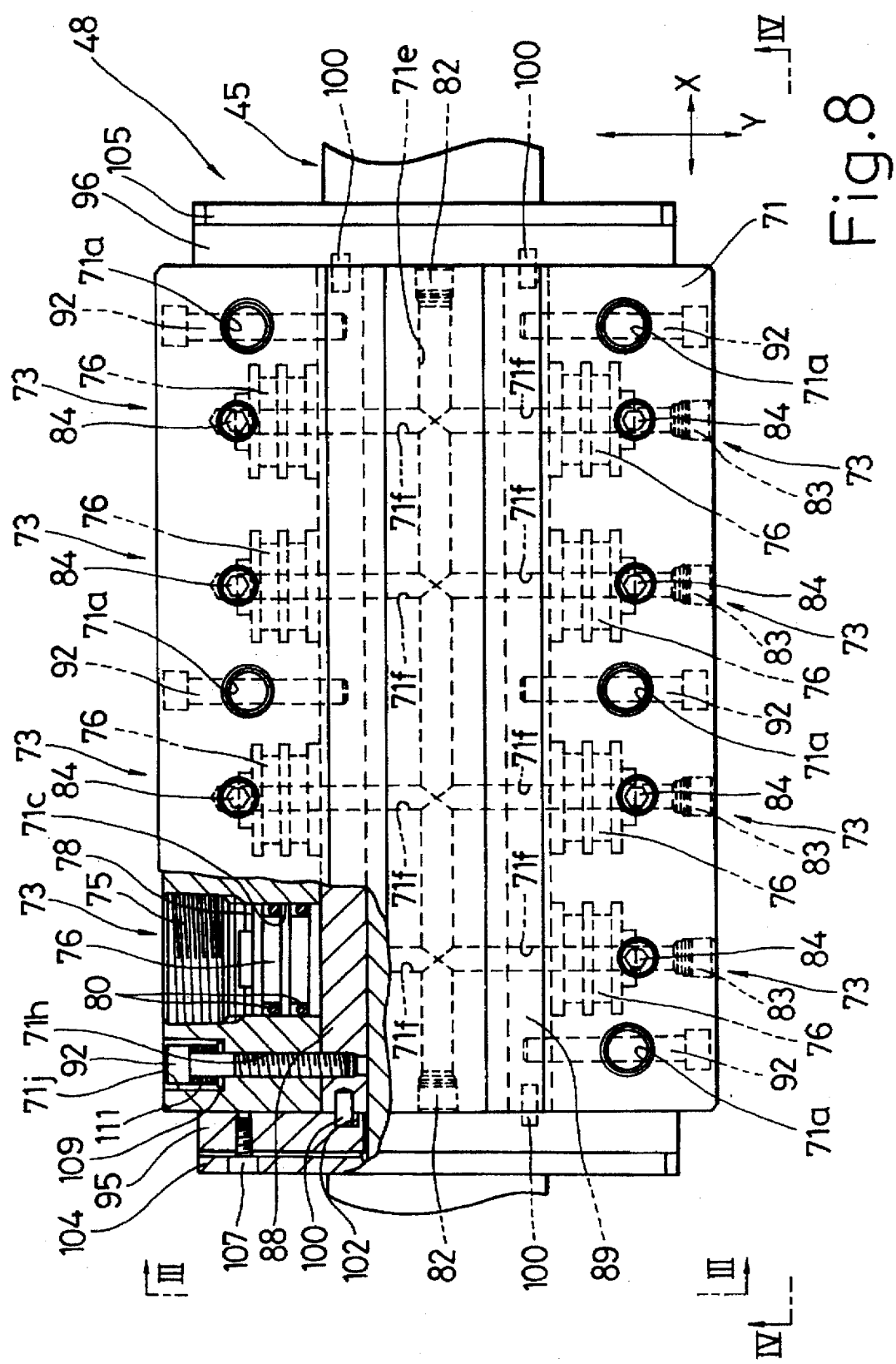
FIG. 8 is an overhead view, including a partial cross-section, of the brake unit and track rail equipped on the linear motion rolling guide unit shown in FIGS. 4 and 5.
Figure 9:
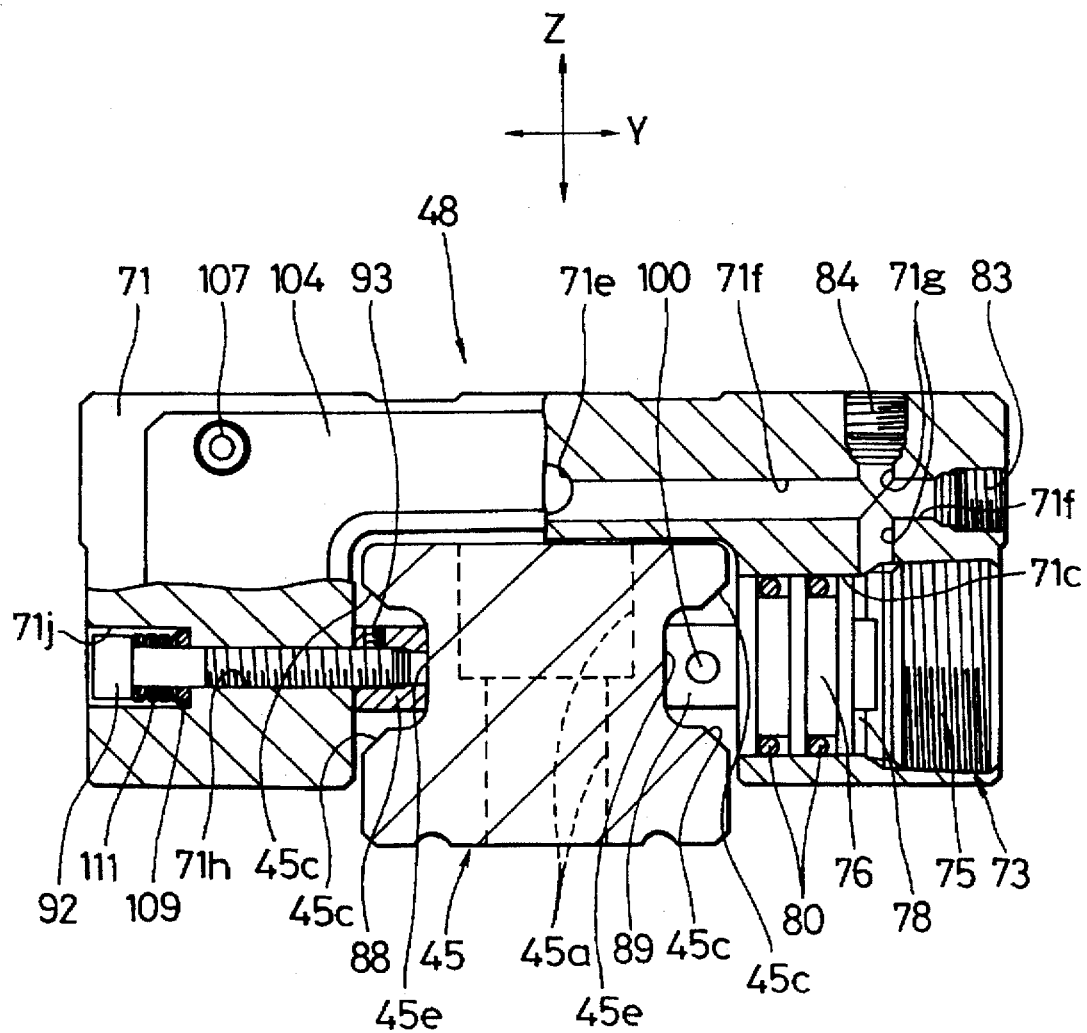
FIG. 9 is a left side view, including a partial cross-section, taken along arrows III—III relating to FIG. 8.
Figure 10:
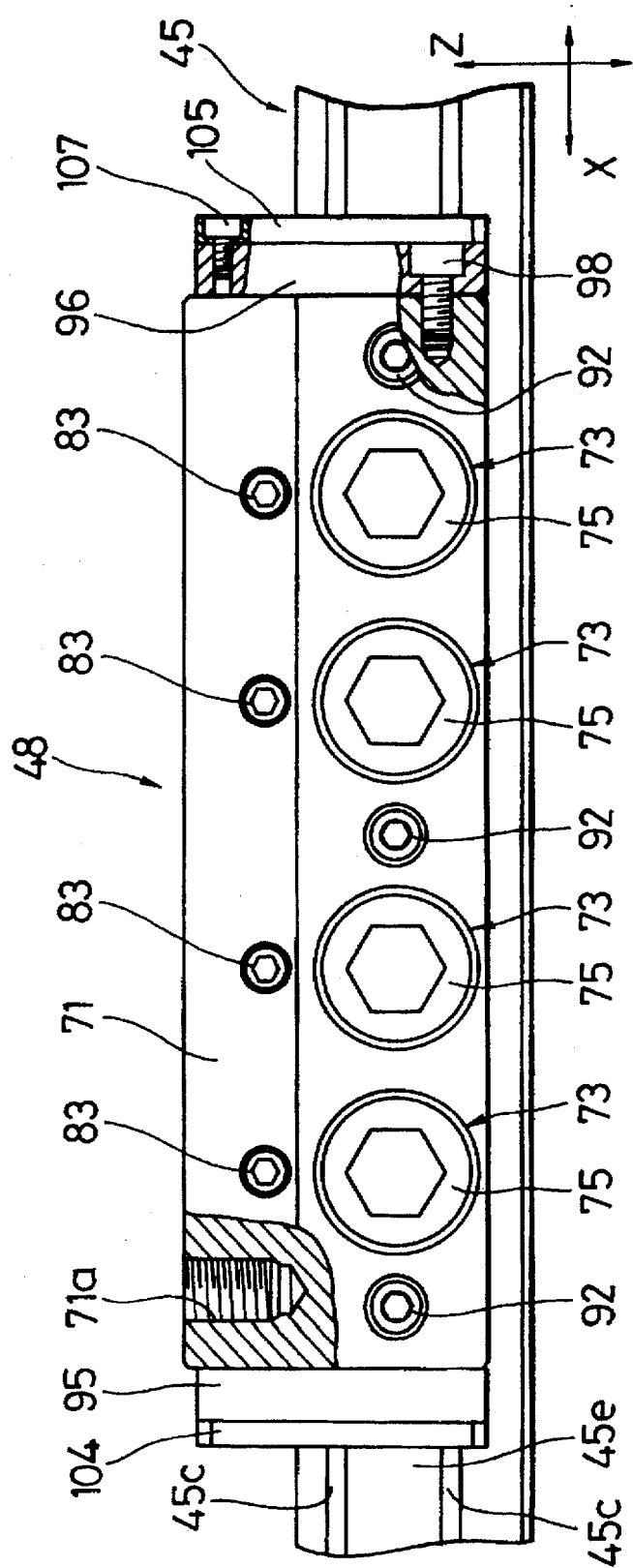
FIG. 10 is a front view, including a partial cross-section, taking along arrows IV—IV relating to FIG. 8.

As shown in FIGS. 8 through 10, said brake unit 48 is equipped with casing 71 formed using metal as the material. This casing 71 is juxtaposed about track rail 45 and is able to freely perform relative movement with respect to said track rail 45. As is clear from FIGS. 8 and 10, a total of 6 threaded holes 71a, three each of which are spaced equally to the left and right, are formed in the upper surface of said casing 71, and table 43 shown in FIGS. 4 and 5 is fastened to said casing 71 by bolts (not shown) that are screwed into these threaded holes 71a. Namely, as is clear from FIG. 5, this casing 71 equipped on brake unit 48 is formed so that its upper surface is in the same plane as the upper surface of casing 54 equipped on slide unit 47, and table 43 is directly attached to these casings 71 and 54. Furthermore, although the above-mentioned threaded holes 71a formed in casing 71 of brake unit 48 function as attachment members for attaching table 43 in this manner, said attachment members are not limited to these threaded holes 71a, but rather various other constitutions can be applied such as forming threaded insertion holes into which bolts are inserted, or conversely, implanting male threads. Since the attachment members are provided in advance in this manner, there is no need to have special tools available, thereby enabling attachment of table 43 to be performed easily and quickly.

As is clear from FIGS. 8 through 10, and particularly from FIG. 8, cylinder mechanisms 73 are provided at, for example, 8 locations on both the left and right wings with 4 locations on each side. Furthermore, in order to avoid making the drawing excessively complicated, only one of the cylinder mechanisms 73 at these eight locations is shown in detail in the drawings. However, in order to clarify the position of each cylinder mechanism 73 provided at 8 locations, only piston rod 76 equipped on each cylinder mechanism is shown in FIG. 8 for each of the other seven locations of cylinder mechanism 73 not shown in detail.

More specifically, each cylinder mechanism 73 described above is composed in the manner described below.

Figure 11:
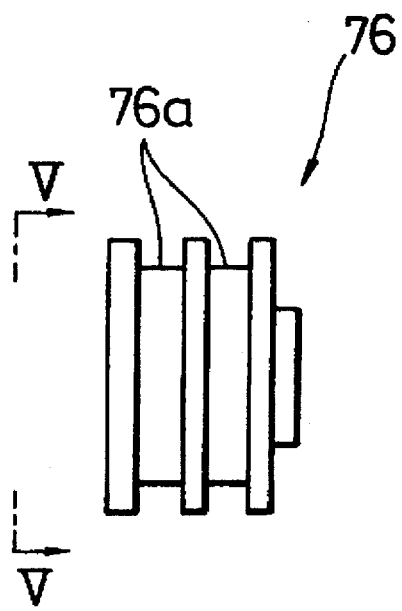
FIG. 11 is a side view of the piston rod equipped on the brake unit shown in FIGS. 8 through 10.
Figure 12:
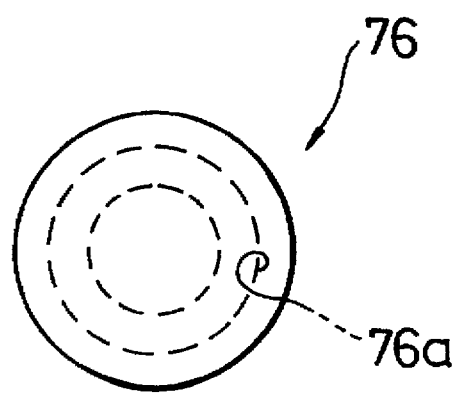
FIG. 12 is a view taken along arrows V—V relating to FIG. 11.

As is clear from FIGS. 8 through 10, through hole 71c is formed in the wing of the above-mentioned casing 71 so as to pass through laterally (direction of arrow Y). Plug 75 is screwed into this hole so as to block the outside opening of this through hole 71c, while a protruding/recessing and moving member in the form of piston rod 76 is inserted inside to as to slide freely, thereby forming sealed chamber 78. Furthermore, details of said piston rod 76 are shown in FIGS. 11 and 12. As shown in the drawings, the overall shape of said piston rod 76 is roughly that of a cylinder, and makes smooth sliding contact with the inner wall surface of the above-mentioned through hole 71c. In addition, with respect to the above-mentioned plug 75, this portion can be formed integrated into a single structure with the above-mentioned casing 71, thereby enabling the number of parts to be reduced as a result of doing so.

A fluid in the form of hydraulic fluid (not shown) is filled into the above-mentioned sealed chamber 78.

Two circular grooves 76a (reference numeral is shown only in FIGS. 11 and 12) are formed over the entire circumference in the above-mentioned piston rod 76, and as shown in FIGS. 8 and 9, O-rings 80 that demonstrate sealing action are fit inside said circular grooves.

The above-mentioned piston rod 76 protrudes and recesses with respect to the above-mentioned sealed chamber 78 as a result of injecting and extracting fluid, namely hydraulic fluid, to and from said sealed chamber 78 by a fluid injection and extraction device to be explained below.

As shown in FIGS. 8 and 9, narrow through hole 71e, which passes through casing 71 of brake unit 48 in the longitudinal direction (direction of arrow X), is formed in said casing 71, and plugs 82 are screwed into the openings on both ends of said through hole 71e to block those openings. Four narrow holes 71f, which extend lengthwise in the lateral direction (direction of arrow Y) and are connected to said through hole 71e, are formed from one side of said casing 71, and are blocked by plugs 83 being screwed into the openings of each of said narrow holes 71f. These narrow holes 71f are arranged corresponding to each cylinder mechanism 73 provided at a total of eight locations, four each on the left and right sides of casing 71. As shown in FIG. 9, short narrow holes 71g are formed extending downward from the upper surface of casing 71 so as to be connected to these narrow holes 71f, and the lower end of each said narrow hole 71g is connected to the above-mentioned sealed chamber 78. Furthermore, plugs 84 are also screwed into the opening in the upper end of said narrow hole 71g to block said opening.

On the other hand, as shown in FIG. 4, supply and recovery unit 85 is provided on, for example, bed 42 that supplies hydraulic fluid by applying pressure, or conversely, recovers hydraulic fluid by applying back pressure. One end of tube 85a for performing injection and extraction of hydraulic fluid is connected to this supply and recovery unit 85, while the other end of said tube 85a is connected to either of the above-mentioned through hole 71e, narrow holes 71f or narrow holes 71g. More specifically, one of either of plugs 82, 83 or 84, which are screwed in to respectively block said through hole 71e, narrow holes 71f and narrow holes 71g, is removed and a hollow connecting plug (not shown), provided on the end of the above-mentioned tube 85a, is screwed in instead.

Namely, as a result of hydraulic fluid discharged from supply and recovery unit 85 being injected into the above-mentioned sealed chamber 78 by way of tube 85a and either of the above-mentioned through hole 71e, any of narrow holes 71f or any of narrow holes 71g, the above-mentioned piston rod 76 protrudes. Conversely, as a result of supply and recovery unit 85 applying back pressure, hydraulic fluid is extracted from sealed chamber 78 through the same route, resulting in piston rod 76 recessing.

However, the above-mentioned supply and recovery unit 85 is able to freely change the pressure of the hydraulic fluid it supplies. Namely, as shown in FIG. 4, knob 85b, for regulation of hydraulic pressure, and meter 85c, for confirmation of hydraulic pressure, are provided on this supply and recovery unit 85. An operator is thus able to supply hydraulic fluid at the optimum hydraulic pressure by operating knob 85b as necessary.

The fluid injection and extraction device, which performs injection and extraction of hydraulic fluid into and from the above-mentioned sealed chamber 78, is composed in the manner described above. In addition, a driving force application device, which applies driving force to a moving member in the form of piston rod 76, is composed by said fluid injection and extraction device and the fluid that is handled in the form of the hydraulic fluid itself. In addition, a pressure control device, which applies pressure to the braking members described below towards the surface of track rails 45, is composed by said driving force application device, piston rod 76 driven by said device, casing 71, and peripheral small parts related to these.

As shown in FIGS. 8 and 9, braking members 88 and 89 are arranged on the side of the direction of protrusion of piston rod 76 equipped on each cylinder mechanism 73, four of which each are provided in the left and right wings of the above-mentioned casing 71. As shown in the drawings, the cross-sectional shape of these braking members 88 and 89 is roughly square, while they have a length that extends roughly over the entire length of the above-mentioned casing 71. Each of said braking members 88 and 89 demonstrate braking action by making contact with the surface of track rail 45, and make contact with the track rail surface as a result of being pushed by the above-mentioned pressure control device, and more specifically, the above-mentioned piston rod 76.

The portions of the above-mentioned braking members 88 and 89 that make contact with track rail 45 are rough in order to obtain a high degree of friction. More specifically, a large number of grooves (not shown) are cut at right angles in the lengthwise direction. As a result of forming these grooves, a friction coefficient of 0.1 or more is obtained in the state in which a lubricant is supplied between track rail 45 and said braking members 88 and 89. Braking force is increased as a result of employing said constitution. Furthermore, shot blasting or other techniques may be employed to achieve the rough surface of the portions of braking members 88 and 89 that make contact with track rail 45. In addition, with respect to track rails 45 as well, if a rough surface is also given to the portions that make contact with braking members 88 and 89, an even larger braking force is obtained. In addition, surface treatment in the form of ion plating (TiN, CrN) is performed on the portions of braking members 88 and 89 that make contact with track rail 45 when the emphasis is placed on their wear resistance. In addition, an example of a wear-resistant material that may be affixed to braking members 88 and 89 is Metaloplast (registered trade name) sold by the Norton Corporation of West Germany. The wear resistance of braking members 88 and 89 is improved as a result of this type of wear-resistant treatment. Together with this enabling a solid fixing state to be constantly obtained even when used for a long time, frequent replacement of said braking members is not required. Furthermore, steel materials are used for both braking members 88 and 89. In addition, the use of various other known treatments and materials can naturally also be used to achieve the increased braking force and improved wear resistance described above.

In addition, as is clear from FIG. 9, both the above-mentioned braking members 88 and 89 are made to make contact with track rails 45 at a site other than track surfaces 45c formed in said track rails 45, and in this case, at the bottom surface of grinding relief grooves 45e formed for grinding said track surfaces 45c. Thus, since track surfaces 45c of track rails 45 are not damaged, the smooth operation of the rolling guide unit is maintained.

The following provides a detailed description of the structure for attaching both braking members 88 and 89 to the above-mentioned casing 71.

As is clear from FIGS. 8 through 10, and particularly from FIG. 8 a total of six bolts 92 (with hexagon sockets), three each in each wing, are inserted so as to slide freely from the outside to the inside in both the left and right wings of the above-mentioned casing 71. Furthermore, to avoid making the drawings excessively complicated, only one of these six bolts 92 are shown in detail using solid lines in FIGS. 8 and 9. However, the other five bolts 92 are shown with broken lines in FIG. 8 to clarify each of their arrangement positions. The following provides an explanation of bolt 92 shown with solid lines as a representative example.

As shown in FIGS. 8 and 9, the threaded portion of bolt 92 engages so as to slide freely in insertion hole 71h formed in casing 71. The end of said threaded portion screws into the above-mentioned braking members 88 and 89. Namely, together with holding braking members 88 and 89, said insertion hole 71h and bolt 92 compose a retaining guiding device that guides said braking members 88 and 89 in the direction of approach and separation with respect to track rail 45 (lateral direction: indicated with arrow Y). These braking members 88 and 89 do not shift out of position in the lengthwise direction of track rail 45 as a result of being firmly positioned due to the rigidity of this retaining guiding device, thereby enabling them to reliably demonstrate braking function. Furthermore, in FIG. 9, reference numeral 93 indicates a set screw that prevents loosening of the above-mentioned bolt 92 as a result of engaging with said bolt 92. In addition, both braking members 88 and 89 can be replaced by removing each bolt 92.

In addition, as shown in FIGS. 8 and 10, a pair of end plates 95 and 96 are fastened to both the front and back ends of the above-mentioned casing 71 by bolts 98 (with hexagon sockets). As is clear from FIG. 8, both said end plates 95 and 96 act as restricting members that engage with both the front and back ends of braking members 88 and 89 to restrict the movement of each of said braking members 88 and 89 in the lengthwise direction of track rails 45. Consequently, the positioning of both braking members 88 and 89 in the lengthwise direction of the track rails is made even more solid.

Furthermore, as shown in FIGS. 8 and 9, pins 100 are fit into both the front and back ends of both braking members 88 and 89 at one of their ends, while the other ends of said pins 100 are fit so as to slide freely into relatively long narrow holes 102 formed so as to extend in the lateral direction of the above-mentioned end plates 95 and 96 (see FIG. 8). These pins 100 and long holes 102 mainly perform positioning in the vertical direction (direction of arrow Z) of both braking members 88 and 89.

In addition, as is shown in FIGS. 8 through 10, seal members 104 and 105 are fastened by small bolts 107 (with hexagon sockets) to each of the outer surfaces of the ends in the direction of the relative movement of the above-mentioned casing 71 with respect to track rails 45, and more specifically, both of the above-mentioned end plates 95 and 96. The lips of these seal members 104 and 105 are made to be in contact with the surface of the track rails, thereby preventing infiltration of dust and debris into the mutual contact portions of track rail 45 and casing 71, as well as leakage of lubricant filled into casing 71, to maintain a smooth operating state for a long time. Furthermore, it is even more effective to provide seal members not only on the ends in the direction of movement of casing 71 in the manner described above, but also on the slightly open lower surface as well.

According to the constitution described above, piston rod 76 equipped on each cylinder mechanism 73 performs protruding operation as a result of hydraulic fluid being supplied into sealed chamber 78 previously described. As a result, both braking members 88 and 89 are pushed toward track rail 45, thus causing brake unit 48, slide units 47 (see FIGS. 4 through 7) and table 43 (see FIGS. 4 and 5) to become fixed with respect to track rails 45, and therefore bed 42 (see FIGS. 4 and 5).

In addition, each piston rod 76 performs recessing operation as a result of back pressure being supplied to the above-mentioned sealed chamber 78 resulting in extraction of hydraulic fluid. In the case each piston rod 76 is linked to both braking members 88 and 89, both braking members 88 and 89 are released from the state of contact with track rail 45 by the recessing operation of this piston rod 76, and then move away from said track rail 45. In the present embodiment, however, each piston rod 76 only makes contact with both braking members 88 and 89 and is not linked to them. Therefore, a releasing device is provided to release both braking members 88 and 89 from track rail 45 corresponding to the recessing operation of each piston rod 76, and said releasing device is composed in the manner described below. Furthermore, each piston rod 76 may be linked to both braking members 88 and 89, and in this case as well, a situation can be considered in which both braking members 88 and 89 are not completely released from track rail 45, but rather end up still making contact while leaving a slight pushing pressure on track rail 45 at the point recession of piston rod 76 is completed. In this case, the providing of said releasing device is effective for the purpose of forcibly releasing braking members 88 and 89 from track rail 45.

As shown in FIGS. 8 and 9, each bolt 92 of a total of six bolts, provided so as to retain and guide both of the above-mentioned braking members 88 and 89, are such that their head portions and the portions near their necks are located in countersunk portions 71j formed in casing 71. Furthermore, in order to avoid making the drawings excessively complicated, only one of the six bolts 92 are shown in detail in FIGS. 8 and 9, while the other five bolts 92 are not shown in detail.

Flat washer 109 is provided on the bottom surface of the above-mentioned countersunk portion 71j in the state in which it fits onto bolt 92, and a plurality of disc springs 111 are provided on top of each other between said flat washer 109 and the head portion of bolt 92 that act as releasing devices. These disc springs 111 are fit onto bolt 92 so that each of their protruding sides is alternately facing in the opposite direction. According to said constitution, when each above-mentioned piston rod 76 performs protruding operation and pressure is applied on both braking members 88 and 89 toward track rail 45, each said disc spring 111 is resiliently deformed. Then, as each piston rod 76 begins to recede, the resiliency of each disc spring 111 acts on both braking members 88 and 89 by means of bolts 92, thus forcibly releasing each of said braking members 88 and 89 from track rail 45.

As a result of providing a releasing device like that described above, both braking members 88 and 89, which have been released from pushing force by the pressure control device described above, are reliably released from track rail 45, thus eliminating sliding resistance produced in the case of braking members 88 and 89 moving along track rail 45 without being sufficiently released, and maintaining smooth operation of the rolling guide unit.

Continuing, the following provides an explanation of the operation of a cutting machine that contains the linear motion rolling guide unit having the constitution described above.

As shown in FIG. 5, a workpiece 114 is placed and fixed on table 43. In this state, table 43 is suitably moved as indicated with arrow S in FIGS. 4 and 5 by a driving device not shown. Next, table 43, namely workpiece 114, reaches the desired processing location at which processing is to be performed and stops. Then, hydraulic fluid at a prescribed pressure is discharged from supply and recovery unit 85 shown in FIG. 4 according to a braking command signal emitted according to the operation of an operation switch for braking installed on the operation panel (not shown) and so forth of said cutting machine by an operator, or according to a braking command signal emitted based on memory data recorded in advance in a memory device (ROM) by a control unit, consisting of a microcomputer and so forth, equipped on said cutting machine. As a result, each piston rod 76 described above is made to protrude thereby causing both braking members 88 and 89 to make contact with the surface of track rails 45 to apply pressure and achieve a fixed state.

Once a fixed state has been achieved as described above, the desired cutting work is performed on workpiece 114.

Once cutting work is completed, a braking release command signal is emitted by means of a similar device as described above. As a result, each piston 76 recedes thereby causing both braking members 88 and 89 to be released from track rails 45 due to the force applied by disc springs 111 described above resulting in release of the fixed state.

As has been described above, since a constitution is employed wherein a pressure control device is used for the pushing force generation source that can be either automatically or remote controlled, brake unit 48 is able to accommodate braking no matter how high the required operating frequency or how fast the operation, thus contributing to improvement of the work efficiency of said cutting machine. In addition, when obtaining the above-mentioned fixed state or released state, since the operator either operates an operating switch or hardly has to perform anything, the range over which the operator has to move is correspondingly reduced, while also simplifying the work itself.

However, as was previously described, in said linear motion rolling guide unit, the pushing force applied to each braking member 88 and 89 can be changed by operating knob 85b of supply and recovery unit 85 shown in FIG. 4. Thus, in the case of suitably changing the cutting depth or cutting speed with respect to workpiece 114 (see FIG. 5) in said cutting machine, the optimum pushing force can be set that is required to maintain the fixed state corresponding to that change. Thus, problems such as applying excessive pushing pressure despite the cutting force or other applied force being relatively small are avoided, and this is effective from the viewpoints of fatigue of each member, conservation of energy and so forth.

In addition, in said linear motion rolling guide unit, the above-mentioned pressure control device is composed of casing 71, which is able to freely perform relative movement with respect to track rail 45, moving members in the form of piston rods 76, which are provided to slide freely in a prescribed direction in said casing 71, for applying pushing pressure to braking members 88 and 89, and a driving force device (previously described) that applies driving force to said piston rods 76. Namely, brake units 48, which are composed of the above-mentioned pressure control device (the cylinder mechanism portion) and braking members 88 and 89, are not integrally assembled with respect to slide units 47 equipped in the linear motion rolling guide unit, but rather are provided separately from said slide units 47. Thus, since brake units 48 are provided separately from slide units 47, in addition to the number of brake units 48 provided being able to be increased or decreased as necessary, their handling, including their attachment and removal, is easy.

In addition, since brake units 48 are separate from slide units 47 in this manner, said brake units 48 and slide units 47 can be fabricated both simply and inexpensively, thereby achieving reduced cost and so forth of the entire linear motion rolling guide unit.

In addition, as a result of making brake units 48 separate from slide units 47, changes in internal force within said slide units, which has a detrimental effect on guiding properties, can be avoided.

In addition, in said linear motion rolling guide unit, a plurality of piston rods 76 for applying pushing pressure to the above-mentioned braking members 88 and 89 are provided in a row along the lengthwise direction of track rails 45. According to this constitution, while pushing force can be increased, if it is possible to suitably change the pushing force of each of a plurality of piston rods 76 provided, the amount of pushing force in the lengthwise direction of the track rails can be adjusted, thus obtaining a state of optimum distribution of pushing force.

In addition, in said linear motion rolling guide unit, cylinder mechanisms 73 are employed as specific examples of the above-mentioned pressure control device. These cylinder mechanisms offer the advantages of being able to easily obtain a large pushing force, while also enabling the pushing force to be controlled with high accuracy. Furthermore, although fluid in the form of hydraulic fluid is used for operating piston rods 76 in the present embodiment, a gas such as air may also be used.

In addition, in said linear motion rolling guide unit, a plurality, in this case two, of the above-mentioned braking members 88 and 89 are provided so as to be juxtaposed about track rails 45 in the short direction of said track rails 45, namely the lateral direction (direction of arrow Y). In said constitution, together with a larger pushing force being able to be obtained in comparison with a single braking member, if the pushing force that is applied to these two braking members 88 and 89 from a pressure control device is set to be equal as in the present embodiment, said pushing force is balanced on both sides of track rails 45, thus eliminating the production of bias force.

Moreover, although not indicated in the present embodiment, a constitution can be employed wherein the above-mentioned braking members 88 and 89 are divided into a plurality of braking members so that each said division is pushed individually. According to this constitution, if only the required number of said divisions are operated, or if the pushing force of each division can be suitably changed, the total pushing force can be changed or the pushing force in the lengthwise direction of the track rails can be adjusted, thereby allowing the obtaining of optimum distribution of pushing force.

Next, an explanation is provided of a linear motion rolling guide unit as a second embodiment of the present invention based on FIGS. 13 through 17. Furthermore, since said linear motion rolling guide unit is composed similarly to the linear motion rolling guide unit as a first embodiment of the present invention described above with the exception of those portions explained below, an explanation of the entire guide unit is omitted, with the explanation only covering the essential portions. In addition, in the following explanation, the same reference numerals are used for those constituents that are identical or correspond to the constituents of the linear motion rolling guide unit as said first embodiment of the present invention. In addition, this applies similarly for the third embodiment to be described later.

Figure 13:
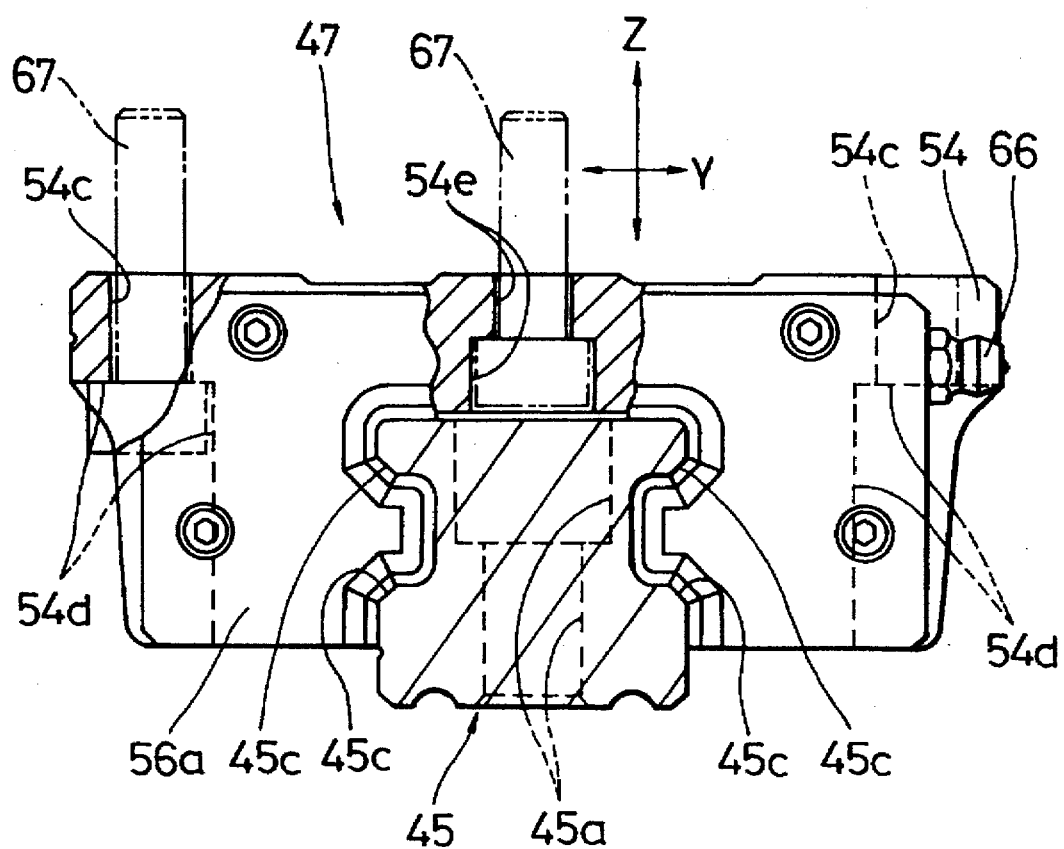
FIG. 13 is a side view, including a partial cross-section, of the track rails and sliders equipped on a linear motion rolling guide unit as a second embodiment of the present invention.
Figure 14:
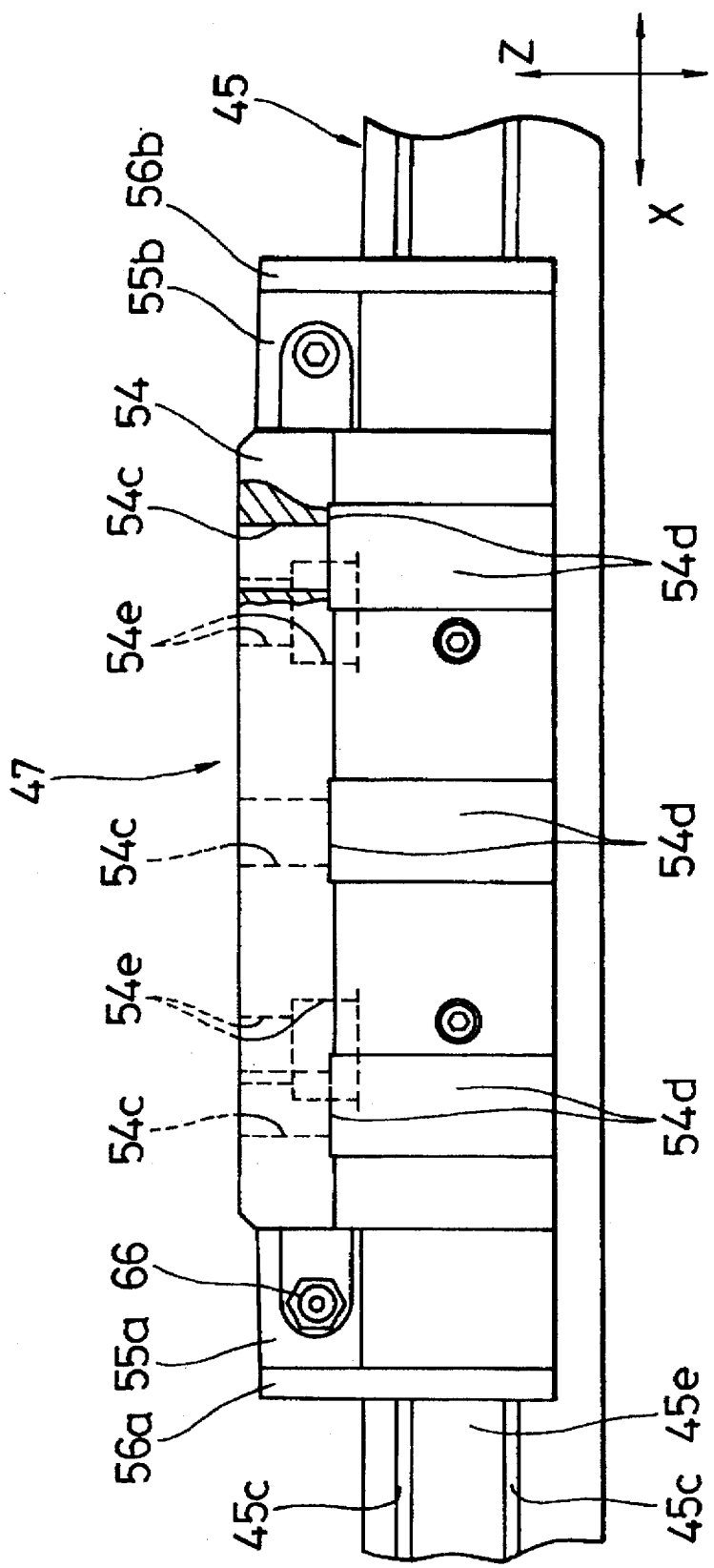
FIG. 14 is a front view, including a partial cross-section, of the constitution shown in FIG. 13.

FIGS. 13 and 14 indicate a slide unit 47 equipped on a linear motion rolling guide unit as a second embodiment of the present invention. As shown in FIG. 13, in said slide unit 47, bolts 67 (with hexagon sockets), for fastening table 43 (see FIGS. 4 and 5) to casing 54 with which it is equipped, are installed facing upward from the lower side of said casing 54. In addition, in the present embodiment, a total of eight of said bolts 67 are provided, consisting of three each in the left and right sides of casing 54, and two in the center. Consequently, insertion holes 54c, into which the threaded portions of said bolts 67 are inserted, and indentations 54d, which contain the head portions of said bolts 67, are formed as attaching portions in the left and right sides of casing 54. In addition, insertion holes 54e, having large diameter and small diameter portions in which the head portions and threaded portions of bolts 67 are respectively inserted, are formed as attaching portions in the center of casing 54.

Figure 15:
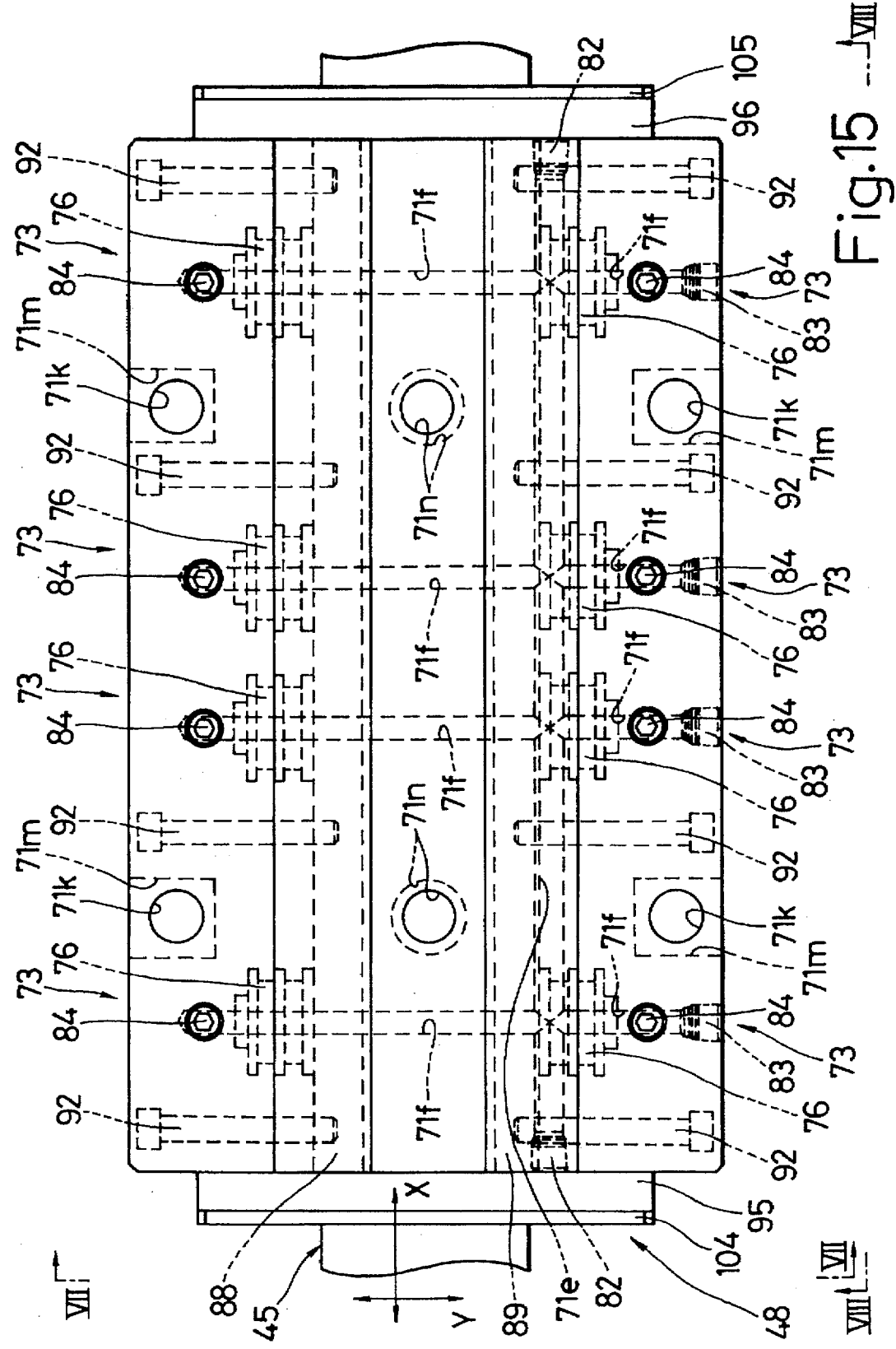
FIG. 15 is an overhead view of the brake unit and track rail equipped on a linear motion rolling guide unit as a second embodiment of the present invention.
Figure 16:
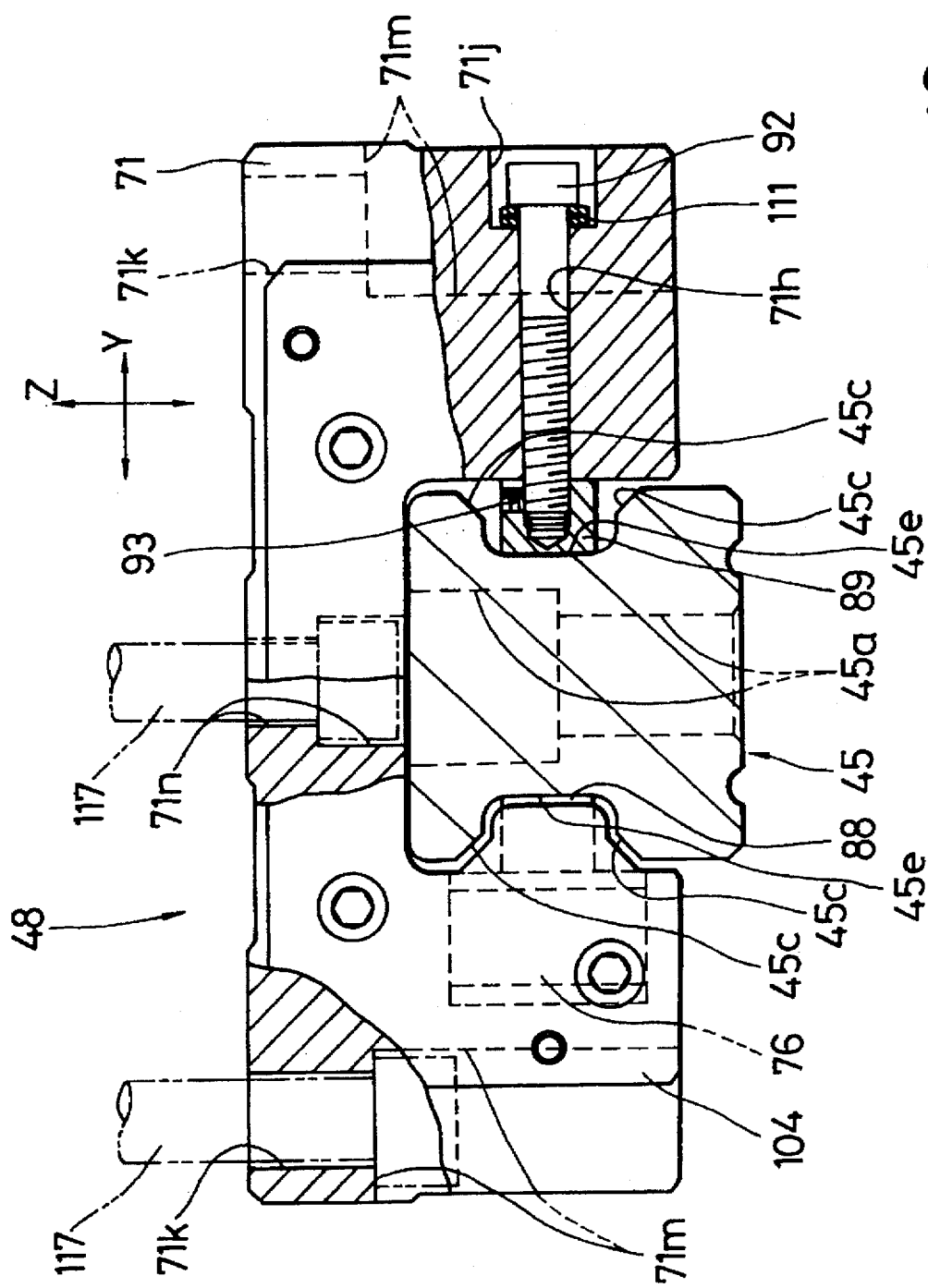
FIG. 16 is a left side view, including a partial cross-section, taken along arrows VII—VII relating to FIG. 15.
Figure 17:
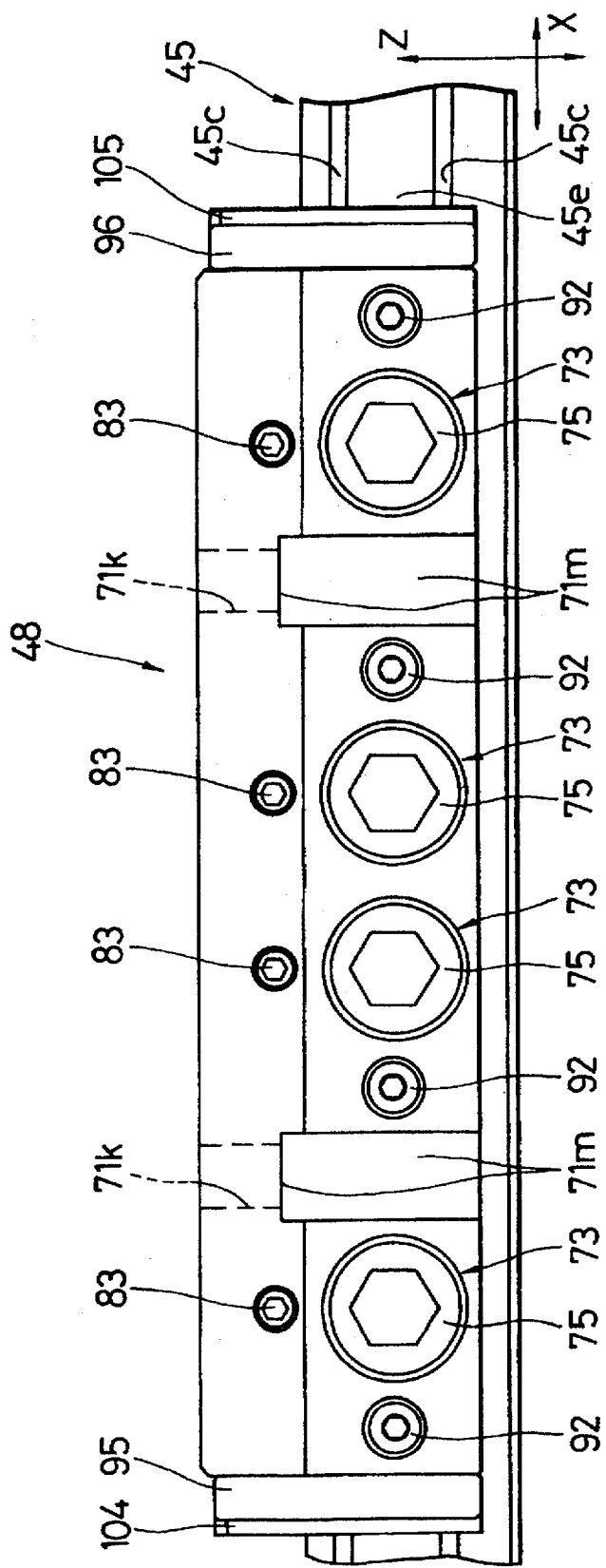
FIG. 17 is a view taken along arrows VIII—VIII relating to FIG. 15.

FIGS. 15 through 17 indicate a brake unit 48 equipped in the linear motion rolling guide unit as a second embodiment of the present invention. As shown in the drawings, in said brake unit 48 as well, bolts 117 (with hexagon sockets), for fastening table 43 (see FIGS. 4 and 5) to casing 71 with which it is equipped, are installed facing upward from the lower side of said casing 71. In addition, in the present embodiment, a total of six of said bolts 117 are provided, consisting two each in the left and right sides of casing 71, and two in the center of said casing 71. Consequently, insertion holes 71k, into which the threaded portions of said bolts 117 are inserted, and indentations 71m, which contain the head portions of said bolts 117, are formed as attaching portions in the left and right sides of casing 71. In addition, insertion holes 71n, having large diameter and small diameter portions in which the head portions and threaded portions of bolts 117 are respectively inserted, are formed as attaching portions in the center of casing 71.

Furthermore, in each of the embodiments described above, although braking members 88 and 89 are pushed from the left and right sides of track rails 45, they may also be pushed only from one side, may be pushed from above, or may be applied a suitable combination of these.

Figure 18:
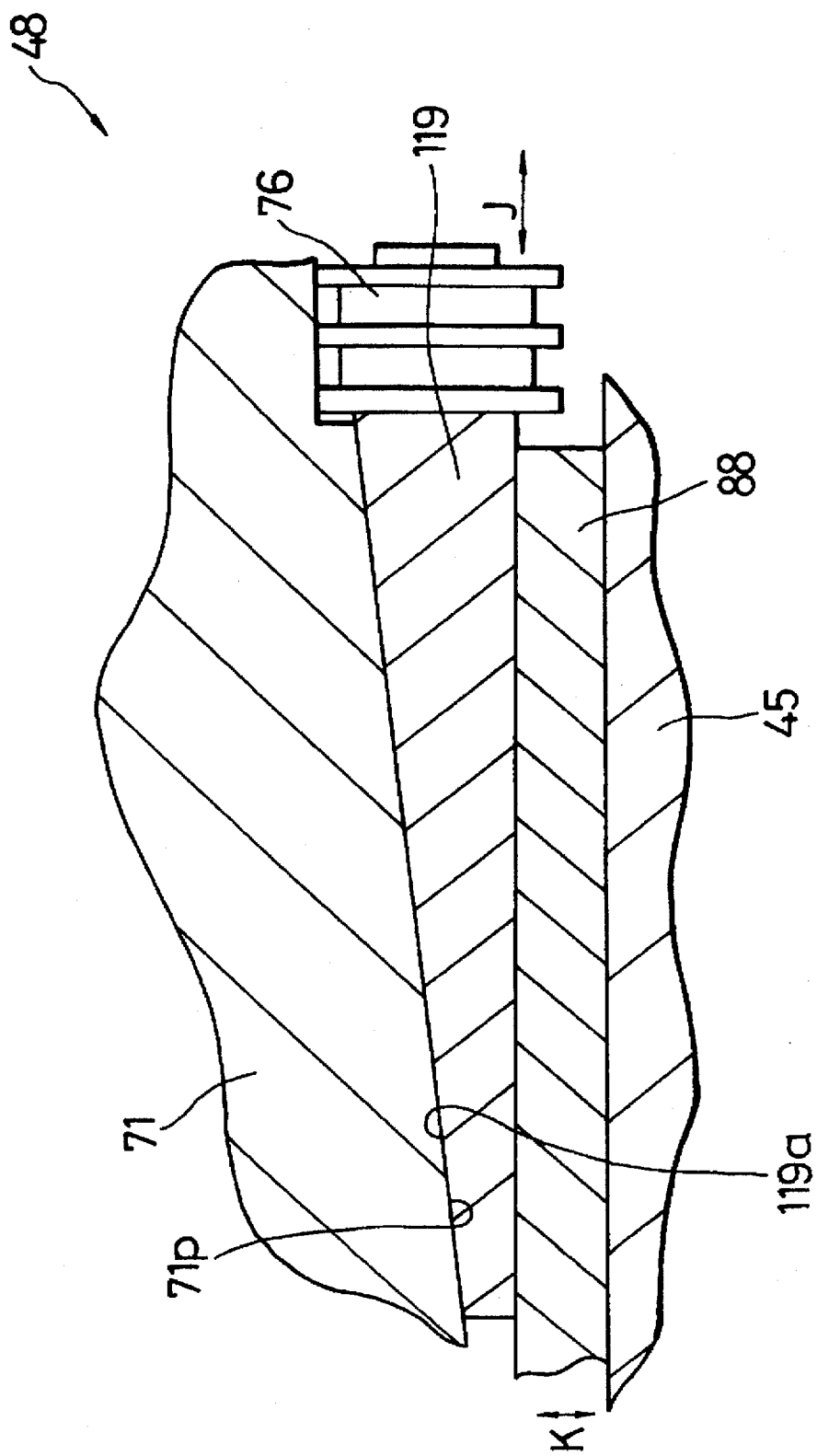
FIG. 18 is a side view showing the essential portion of the brake unit equipped on a linear motion rolling guide unit as a third embodiment of the present invention.

FIG. 18 indicates the essential portion of brake unit 48 equipped on a linear motion rolling guide unit as a third embodiment of the present invention.

As shown in the drawing, in said brake unit 48, tapered jib 119 is attached to the end of piston rod 76. More specifically, tapered jig 119 is fixed to piston rod 76 in the direction in which said piston rod 76 protrudes and recedes (indicated with arrow J), and is attached movably with a degree of freedom in the direction perpendicular to said direction of protrusion and recession, in this case the direction in which braking member 88 approaches and moves away from track rail 45 (indicated with arrow K). As shown in the drawing, this tapered jib 119 makes sliding contact with braking member 88 on one side. Tapered surface 119a, which inclines along the direction of protrusion and recession of piston rod 76, is formed on the other side of tapered jib 119, and said tapered surface 119a makes contact while sliding freely with tapered surface 71p formed in casing 71 at a similar incline.

In said constitution, tapered surface 71a, which is formed in casing 71 so as to make sliding contact with the above-mentioned tapered surface 119, acts as a wedging device, namely a doubling device, thus enabling the pushing force of piston rod 76 to be doubled when transmitted to braking member 88. Thus, the desired pushing force can be obtained even if the output of the cylinder mechanism containing said piston rod 76 is reduced.

However, in each of the above-mentioned embodiments, although a hydraulic or pneumatic cylinder mechanism is used that contains a moving member in the form of a piston rod for the device that pushes braking members 88 and 89 towards the surface of track rails 45, that having the constitution described below (not shown) can also be applied.

Firstly, while using a screw as the moving member, the above-mentioned braking member is coupled to the end of said screw, and said braking member is operated by the forward and backward movement in the axial direction of said screw by rotational driving. Next, an electromagnet, and more specifically a solenoid plunger, is used instead of the above-mentioned cylinder mechanism. In addition, the braking member can be operated by using a link member and joint, which are the essential elements of a link mechanism, for the above-mentioned moving member, or by using a lever as the moving member, and linking the point of application of said lever to the above-mentioned braking member. Another example of a constitution is one that uses a spring for the moving member. Namely, the above-mentioned braking member is coupled to said spring, and said braking member is pushed by the resiliency of said spring. In addition, the braking member can be operated with a cam mechanism that contains a cam member for the moving member, or a piezoelectric device may also be used for the moving member.

Furthermore, in each of the above-mentioned embodiments, although the pushing force to be applied to braking members 88 and 89 is variable, there is no need for this pushing force to be variable if simply pushing braking members against track rails 45 is the only factor considered.

In addition, in each of the above-mentioned embodiments, although brake units 48, having braking function, are provided separate from slide units 47, mechanisms that perform braking action may also be contained within said slide units 47.

In addition, the above-mentioned brake units 48 can also be made to demonstrate damping action by means of the pressure of hydraulic fluid in addition to its braking action. Namely, during the time cutting work is being performed on workpiece 114 (see FIG. 5), it is continuously subjected to mechanical vibrations and so forth. In the case when there are no measures against such vibrations employed, there is the possibility of the processed surface becoming uneven due to these vibrations and so forth. Since damping is performed as a result of brake unit 48 demonstrating damping action, the finished accuracy of the processed surface can be maintained at all times.

In addition, in each of the above-mentioned embodiments, although the reaction produced when each piston 76 pushes braking members 88 and 89 has an effect on casing 71, casing 71 has been confirmed to be provided with sufficient rigidity with respect to this point according to experiments conducted by the applicant.

However, in each of the above-mentioned embodiments, although a linear motion rolling guide unit is indicated that operates linearly as a rolling guide unit, a curved motion rolling guide unit can naturally also be applied in which the track rails are curved.

In addition, the present invention is not limited to the constitutions of each of the embodiments described above, but rather the constitutions of each of these embodiments, a portion thereof, can be suitably combined and mutually applied to be able to realize a diverse range of constitutions, As has been explained above, in the braking apparatus and rolling guide unit according to the present invention, a pressure control device composed of a hydraulic cylinder mechanism and so forth is operated according to a braking command signal emitted according to the operation of an operation switch for braking installed on a machine tool and so forth by an operator, or according to a braking command signal emitted based on memory data by a control unit equipped on said machine tool and so forth, thereby causing braking members to make contact with and push on the surface of track rails resulting in a fixed state. In addition, braking members are released from the track rails by the emission of a braking release command signal, resulting in the release of this fixed state.

Thus, since a constitution is employed wherein a pressure control device is used for the pushing force generation source that can be either automatically or remote controlled, the brake unit is able to accommodate braking no matter how high the required operating frequency or how fast the operation, thus contributing to improvement of the work efficiency of said cutting machine.

In addition, when obtaining the above-mentioned fixed state or released state, since the operator either operates an operating switch or hardly has to perform anything, the range over which the operator has to move is correspondingly reduced, while also simplifying the work itself.

Moreover, in the braking apparatus according to the present invention, with respect to the above-mentioned pressure control device, the pushing force that is produced is variable. Thus, in the case of suitably changing the cutting depth or cutting speed with respect to a workpiece in a cutting machine performing cutting processing, the optimum pushing force can be set that is required to maintain the fixed state corresponding to that change, and problems such as applying excessive pushing pressure despite the cutting force or other applied force being relatively small are avoided, making this effective from the viewpoints of fatigue of each member, conservation of energy and so forth.

In addition, in the braking apparatus according to the present invention, the above-mentioned pressure control device is composed of casings that are able to freely perform relative movement with respect to track rails, moving members for pushing on the above-mentioned braking members while provided so as to move freely in a prescribed direction in said casing, and a driving force application device that applies driving force to said moving members. Namely, said braking apparatus is not integrally assembled with respect to the slide units equipped in the rolling guide unit in which said braking apparatus is to be incorporated, but rather is provided separately from said slide units. Thus, since the brake apparatus is provided separately from the slide units of the rolling guide unit, in addition to the number of braking apparatuses being able to be increased or decreased as necessary, their handling, including their attachment and removal, is easy.

In addition, since the braking apparatus is separate from the slide units in this manner, said brake apparatus and slide units can be fabricated both simply and inexpensively, thereby achieving reduced cost and so forth of the entire rolling guide unit.

In addition, as a result of making the braking apparatus separate from the slide units, changes in internal force within said slide units, which has a detrimental effect on guiding properties, can be avoided.

In addition, in the braking apparatus according to the present invention, a plurality of the above-mentioned moving members for applying pushing pressure to the above-mentioned braking members are provided in a row along the lengthwise direction of track rails. According to this constitution, while pushing force can be increased, if it is possible to suitably change the pushing force of each of a plurality of moving members provided, the amount of pushing force in the lengthwise direction of the track rails can be adjusted, thus obtaining a state of optimum distribution of pushing force.

In addition, in the braking apparatus according to the present invention, the portions of the above-mentioned braking members that make contact with the track rails are rough. Accordingly, braking force is increased.

Moreover, in the braking apparatus according to the present invention, that having the constitution described below is employed as a specific example of the above-mentioned pressure control device.

Namely, a sealed chamber is provided in the above-mentioned casing, and the above-mentioned moving members are composed of protruding and receding members that perform protruding and receding operation with respect to said sealed chamber. The above-mentioned driving force application device is composed of fluid that is filled into said sealed chamber, and a fluid injection and extraction device that performs injection and extraction of said fluid into said sealed chamber to cause said protruding and receding member to protrude and recede. More specifically, these are hydraulic or pneumatic cylinder mechanisms that contain moving members in the form of piston rods. These cylinder mechanisms offer the advantages of being able to easily obtain a large pushing force, while also enabling control of pushing force with high accuracy.

In addition, in the braking apparatus according to the present invention, a plurality of the above-mentioned braking members are provided so as to be positioned on both sides of a track rail in the short direction of said track rail. In said constitution, together with a larger pushing force being able to be obtained in comparison with a single braking member, if the pushing force that is applied to this plurality of braking members from a pressure control device is set to be equal, said pushing force is balanced on both sides of the track rail, thus eliminating the production of bias force.

In addition, in the braking apparatus according to the present invention, the above-mentioned braking members are divided in the lengthwise direction of the track rails so that each said division is pushed individually. According to this constitution, if only the required number of said divisions are operated, or if the pushing force of each division can be suitably changed, the total pushing force can be changed or the pushing force in the lengthwise direction of the track rails can be adjusted, thereby allowing the obtaining of optimum distribution of pushing force.

Also in the braking apparatus according to the present invention, releasing devices are provided for releasing the above-mentioned braking members from the track rails. Thus, the braking members, which have been released from pushing force by a pressure control device, are reliably released from the track rails, thus eliminating sliding resistance produced in the case of said braking members moving along the track rails without being sufficiently released, and maintaining smooth operation of the rolling guide unit.

In addition, the braking apparatus according to the present invention has the above-mentioned devices that hold the above-mentioned braking members and guide them in the direction of approach and separation with respect to the track rails. The braking members do not shift out of position in the lengthwise direction of the track rails as a result of being firmly positioned due to the rigidity of these retaining guiding devices, thereby enabling them to reliably demonstrate braking function.

Moreover, in the braking apparatus according to the present invention, the above-mentioned braking members are made to make contact at a site other than the tracks formed in the track rails. Thus, the track surfaces of the track rails are not damaged, and smooth operation of the rolling guide unit is maintained.

In addition, in the braking apparatus according to the present invention, restricting members are provided that engage with the above-mentioned braking members to restrict the movement of said braking members in the lengthwise direction of the track rails. Consequently, the positioning of said braking members in the lengthwise direction of the track rails is made even more solid.

Next, in the braking apparatus according to the present invention, seal members are provided on at least the end of the above-mentioned casing in the direction of relative movement with respect to the track rails. These seal members prevent infiltration of dust and debris into the mutual contact portions of the track rail and casing, as well as leakage of lubricant filled into the casing, thereby maintaining a smooth operating state for a long time.

In addition, in the braking apparatus according to the present invention, threaded holes and screw insertion holes, for example, are provided in the above-mentioned casing as attaching portions for attaching a prescribed table and so forth to said casing. Thus, there is no need to have special tools available, and attachment of a table and so forth can be performed easily and quickly.

In addition, the braking apparatus according to the present invention is equipped with a doubling device that doubles the pushing force produced by the above-mentioned pressure control device and transmits it to the above-mentioned braking members. Accordingly, the desired pushing force can be obtained even if the output of said pressure control device is reduced.

In addition, in the braking apparatus according to the present invention, surface treatment in the form of ion plating is performed on the portions of the above-mentioned braking members that make contact with the track rails. Accordingly, the wear resistance of the braking members is improved, and together with this enabling a solid fixed state to be constantly obtained even when used for a long time, frequent replacement of said braking members is not required.

What is claimed is:

1. A braking apparatus, comprising;
   braking members for performing a braking action via contact with at least one surface of a track rail other than a track surface thereof; and
   a pressure control device for applying a pushing pressure on said braking members towards said at least one surface, said pressure control device comprising:
   a casing which is movable relative to the track rail,
   first means provided in said casing for applying a pushing pressure on said braking members, and
   second means for applying a driving force to said first means.

2. A braking apparatus as set forth in claim 1 wherein the pushing force of said pressure control device is variable.

3. A braking apparatus as set forth in claim 1, wherein a plurality of said first means are arranged in a row along a lengthwise direction of said track rail.

4. A braking apparatus as set forth in claim 1, wherein portions of said braking members that make contact with said track rail have a rough surface.

5. A braking apparatus as set forth in claim 1, wherein a sealed chamber is provided in said casing, said first means comprising a protruding and receding member than protrudes into and recedes from said sealed chamber, said second means comprising a fluid filled in said sealed chamber, and a fluid injection and extraction device that performs injection and extraction of said fluid into and out of said sealed chamber to cause said protruding and receding member to protrude and recede.

6. A braking apparatus as set forth in claim 1, wherein a plurality of said braking members are provided on both sides in the widthwise direction of said track rail.

7. A braking apparatus as set forth in claim 1, wherein said braking members are divided into a plurality of divisions in the lengthwise direction of said track rail, and each division is individually actuated.

8. A braking apparatus as set forth in claim 1, further comprising means for releasing said braking members from said track rail.

9. A braking apparatus as set forth in claim 1, further including a retaining guiding device that holds said braking members, and guides said braking members as they approach and move away from said track rail.

10. A braking apparatus as set forth in claim 1, further including a restricting device provided in said casing for engaging with said braking members in the lengthwise direction of said track rail.

11. A braking apparatus as set forth in claim 1 further including an seal member provided on at least the end of said casing in the direction of relative movement with respect to said track rail.

12. A braking apparatus as set forth in claim 1, further including an attaching portion is provided in said casing for attaching a platform to said casing.

13. A braking apparatus as set forth in claim 1, further including equipped a doubling device that doubles the pushing force produced by said pressure control device and transmits it to said braking members.

14. A braking apparatus as set forth in claim 1, wherein surface treatment in the form of ion plating is performed on the portions of said braking members that make contact with said track rail.

15. A rolling guide unit for use with at least one track rail, comprising; a slider having a rolling element circulating path that includes at least one load bearing track corresponding to said track rail, said slider being able to freely perform relative movement with respect to said track rail; a plurality of rolling elements arranged and contained within said rolling element circulating path, and which bear the load by rolling along said track; and, a braking apparatus that mutually brakes said track rail and slider; said braking apparatus including braking members that perform braking action by making contact with a surface of said track rail other than at a track surface thereof, and a pressure control device that applies a pushing pressure to said braking members in the direction of said surface via a moving member subjected to said pushing pressure.

* * * * *